United States Patent
Ono

(10) Patent No.: US 9,917,312 B2
(45) Date of Patent: Mar. 13, 2018

(54) COOLING AND HEATING DEVICE

(71) Applicant: KYOCERA Corporation, Kyoto-shi, Kyoto (JP)

(72) Inventor: Takashi Ono, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 145 days.

(21) Appl. No.: 15/023,492

(22) PCT Filed: Sep. 26, 2014

(86) PCT No.: PCT/JP2014/075719
§ 371 (c)(1),
(2) Date: Mar. 21, 2016

(87) PCT Pub. No.: WO2015/046464
PCT Pub. Date: Apr. 2, 2015

(65) Prior Publication Data
US 2016/0211534 A1    Jul. 21, 2016

(30) Foreign Application Priority Data

Sep. 27, 2013    (JP) .................................. 2013-201725

(51) Int. Cl.
*H01M 8/04*        (2016.01)
*H01M 8/04014*     (2016.01)
(Continued)

(52) U.S. Cl.
CPC .......... *H01M 8/04014* (2013.01); *F24D 3/08* (2013.01); *F24D 17/001* (2013.01);
(Continued)

(58) Field of Classification Search
CPC .................................................... H01M 8/04
See application file for complete search history.

(56) References Cited

U.S. PATENT DOCUMENTS

| 6,604,364 B1 | 8/2003 | Arman et al. |
| 2011/0262842 A1* | 10/2011 | Yang ................. H01M 8/04052 429/515 |
| 2015/0207157 A1 | 7/2015 | Ono et al. |

FOREIGN PATENT DOCUMENTS

| JP | 07-32871 A | 2/1995 |
| JP | 2004-251592 A | 9/2004 |

(Continued)

OTHER PUBLICATIONS

International Search Report (Form PCT/ISA/210) dated Dec. 9, 2014 and issued for PCT/JP2014/075719.
(Continued)

Primary Examiner — Jacob Marks
(74) Attorney, Agent, or Firm — Procopio Cory Hargreaves and Savitch LLP

(57) ABSTRACT

[Object]
The purpose is to provide a cooling and heating device.
[Solution]
This cooling and heating device includes: a fuel cell device including a fuel cell; a heating unit which utilizes the heat of exhaust gas discharged from the fuel cell; a thermoacoustic cooler (14) including a cooling unit which performs a cooling function with use of the heat of the exhaust gas discharged from the fuel cell; and an exhaust gas switching unit (25) which allows the exhaust gas discharged from the fuel cell to be supplied to at least one of the thermoacoustic cooler (14) and the heating unit, whereby there can be provided a cooling and heating device which effectively utilizes the exhaust gas of a fuel cell.

16 Claims, 4 Drawing Sheets

(51) Int. Cl.
    *F24F 5/00*     (2006.01)
    *F24F 11/02*     (2006.01)
    *F24D 3/08*     (2006.01)
    *F24D 17/00*     (2006.01)
    *F24D 19/10*     (2006.01)
    *H01M 8/04029*     (2016.01)
    *H01M 8/04007*     (2016.01)
    *F25B 27/02*     (2006.01)
    *H01M 8/0612*     (2016.01)
    *H01M 8/124*     (2016.01)
    *F25B 9/14*     (2006.01)

(52) U.S. Cl.
    CPC ............ F24D 19/1066 (2013.01); F24F 5/00 (2013.01); F24F 11/02 (2013.01); H01M 8/04029 (2013.01); H01M 8/04074 (2013.01); *F24D 2200/19* (2013.01); *F25B 9/14* (2013.01); *F25B 27/02* (2013.01); *H01M 8/0618* (2013.01); *H01M 2008/1293* (2013.01); *H01M 2250/10* (2013.01); *H01M 2250/405* (2013.01); *Y02B 90/14* (2013.01); *Y02B 90/16* (2013.01)

(56) References Cited

FOREIGN PATENT DOCUMENTS

| | | |
|---|---|---|
| JP | 2005-172352 A | 6/2005 |
| JP | 2006-2738 A | 1/2006 |
| JP | 2007-59377 A | 3/2007 |
| JP | 2011-214782 A | 10/2011 |
| JP | 2013-117325 A | 6/2013 |
| WO | 2012/104892 A1 | 8/2012 |
| WO | 2014/024946 A1 | 2/2014 |

OTHER PUBLICATIONS

Extended European Search Report dated May 17, 2017, issued by the European Patent Office in counterpart European Patent Application No. 14 848037.9.

* cited by examiner

COOLING AND HEATING DEVICE

TECHNICAL FIELD

The present invention relates to a cooling and heating device that includes a combination of a thermoacoustic cooler and a fuel cell device.

BACKGROUND ART

In recent years, there have been proposed, as next generation energy sources, various fuel cell modules that include fuel cells capable of generating power using a fuel gas (hydrogen-containing gas) and an oxygen-containing gas (air) in a housing, and various fuel cell devices that include fuel cell modules in an exterior casing (refer to Patent Document 1, for example).

Further, in recent years, there have been proposed thermoacoustic refrigerators having a refrigerating function based on thermoacoustic energy (refer to Patent Document 2, for example).

CITATION LIST

Patent Literature

Patent Document 1: Japanese Unexamined Patent Application Publication No. 2007-59377A
Patent Document 2: Japanese Unexamined Patent Application Publication No. 2013-117325A

SUMMARY OF INVENTION

Technical Problem

While various devices such as fuel cell devices and thermoacoustic refrigerators have been developed as next generation energy sources as described above, there is still considerable room for investigating the development of novel applications that combine these devices.

Therefore, an object of the present invention is to provide a novel application that combines a thermoacoustic cooler that uses thermoacoustic energy and a fuel cell device.

Solution to Problem

A cooling and heating device of the present invention includes a fuel cell device including a fuel cell; a heating unit configured to utilize the heat of exhaust gas discharged from the fuel cell; a thermoacoustic cooler including a cooling unit configured to perform a cooling function with use of the heat of the exhaust gas discharged from the fuel cell; and an exhaust gas switching unit that allows the exhaust gas discharged from the fuel cell to be supplied to at least one of the thermoacoustic cooler and the heating unit.

Advantageous Effects of Invention

The cooling and heating device of the present invention switches a supply destination of the exhaust gas discharged from the fuel cell to at least one of the heating unit and the thermoacoustic cooler to selectively utilize one of the heating function of the heating unit and the cooling function of the cooling unit, thereby making it possible to achieve an efficient cooling and heating device.

DESCRIPTION OF EMBODIMENTS

Figure 1:
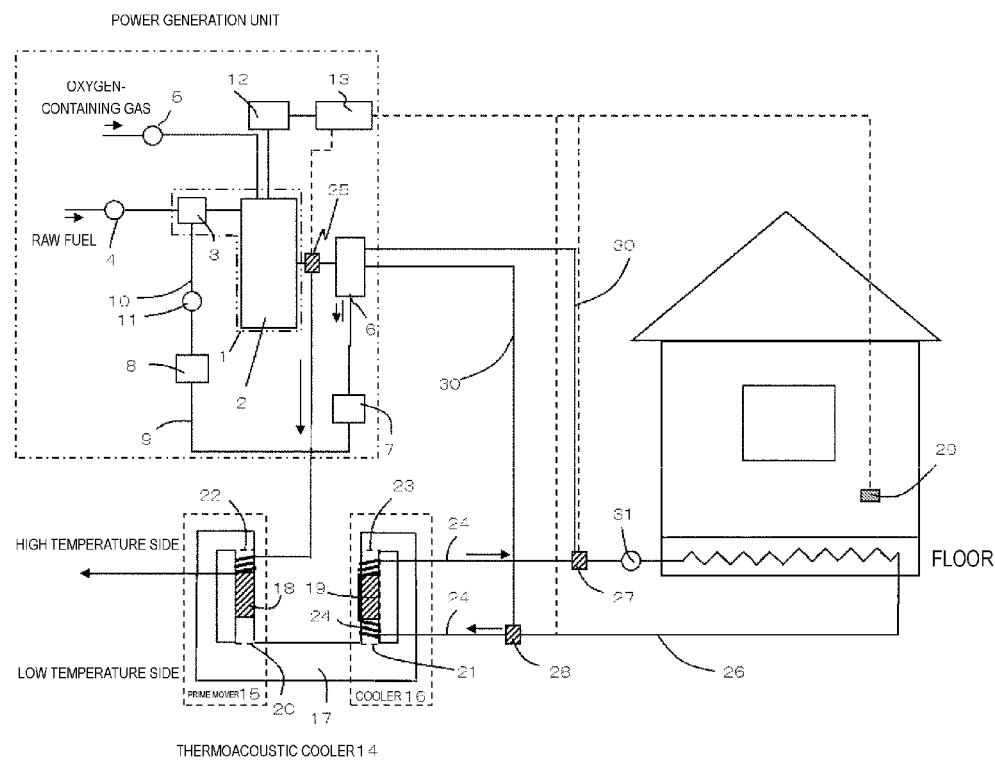
FIG. 1 is a configuration diagram illustrating an example of a configuration of a cooling and heating device of an embodiment.
Figure 2:
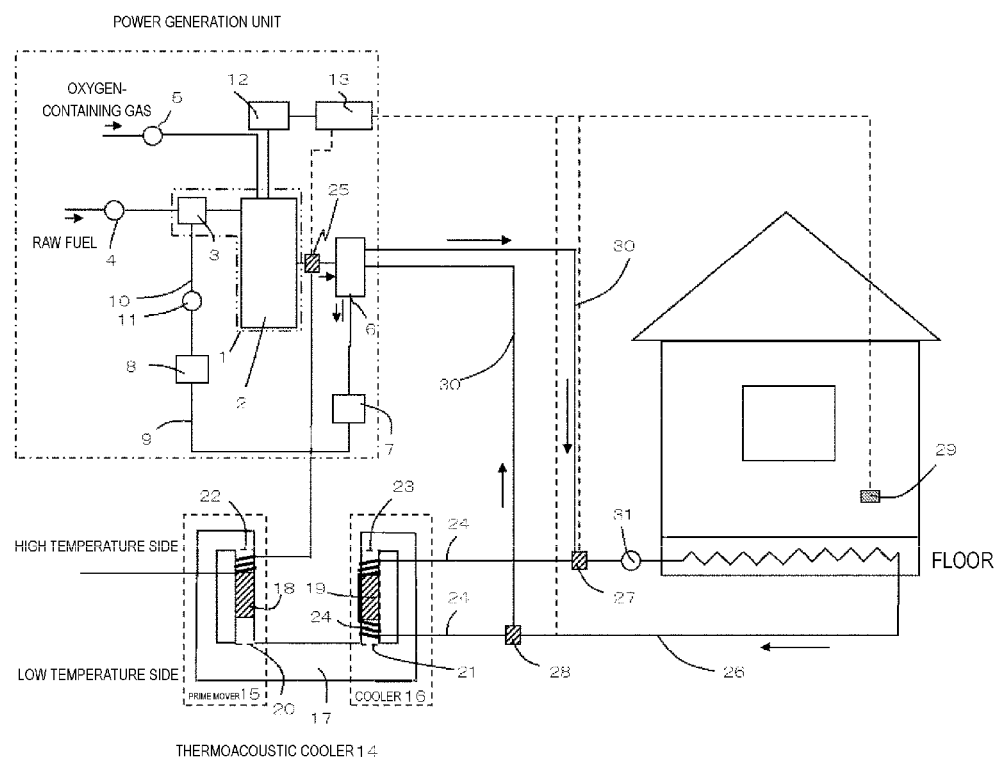
FIG. 2 is a configuration diagram illustrating another example of the configuration of the cooling and heating device of the present embodiment.
Figure 3:
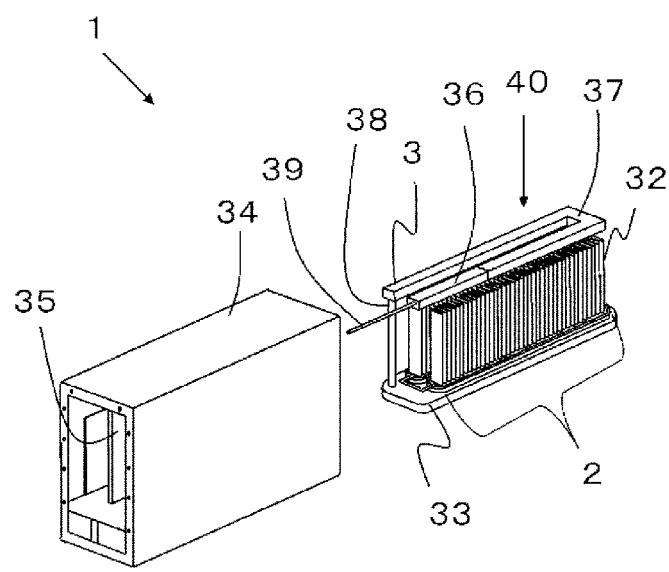
FIG. 3 is an exterior perspective view of an example of a fuel cell module constituting a fuel cell device of the present embodiment.
Figure 4:
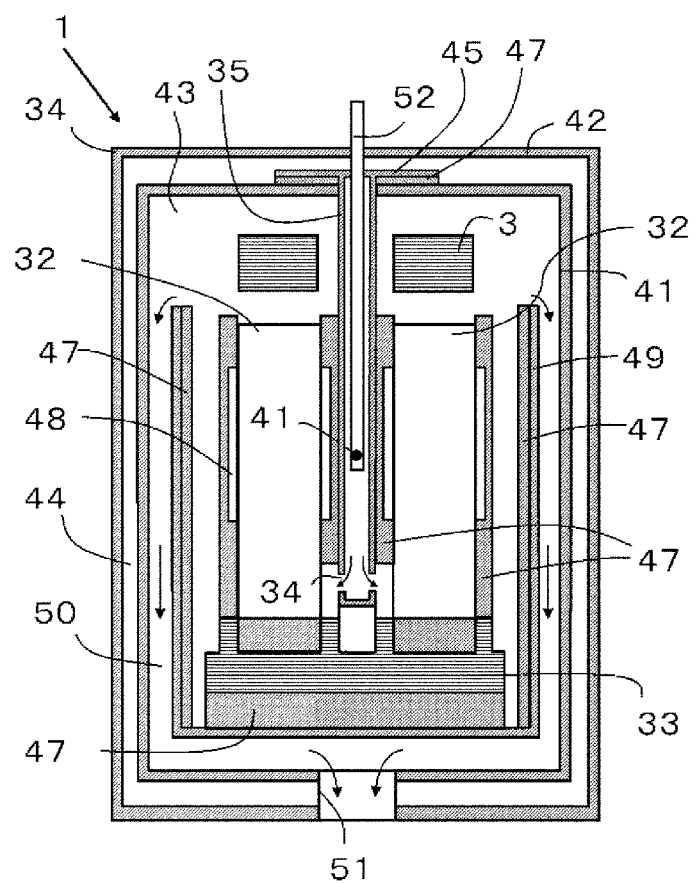
FIG. 4 is a cross-sectional view of the fuel cell module illustrated in FIG. 3.

FIG. 1 is a configuration diagram illustrating an example of a configuration of the cooling and heating device of the present embodiment, FIG. 2 is a configuration diagram illustrating another example of the configuration of the cooling and heating device of the present embodiment, FIG. 3 is an exterior perspective view of an example of the fuel cell module illustrated in FIGS. 1 and 2, and FIG. 4 is a cross-sectional view of the fuel cell module illustrated in FIG. 3. Note that FIG. 1 illustrates a cooling function, FIG. 2 illustrates a heating function, and the configuration of each device is the same. Thus, in the following descriptions of the configurations, FIG. 1 will be mainly used for explanation.

The cooling and heating device illustrated in FIG. 1 includes a power generating unit as an example of a fuel cell device, and a thermoacoustic cooler that produces thermoacoustic energy using exhaust gas discharged from the power generating unit and performs cooling (refrigeration) using the produced thermoacoustic energy. Note that in the subsequent figures, the same reference numerals are used for the same components.

The power generating unit as the fuel cell device illustrated in FIG. 1 includes a cell stack 2 that includes a plurality of fuel cells, a raw fuel supplying means 4 for supplying a raw fuel such as a city gas, an oxygen-containing gas supplying means 5 for supplying an oxygen-containing gas to the fuel cells constituting the cell stack 2, and a reformer 3 that performs steam reforming on the raw fuel using steam. Note that, while described later, a fuel cell module 1 (hereinafter, may be abbreviated as "module 1") includes the cell stack 2 and the reformer 3 in a housing. In FIG. 1, the module 1 is surrounded by a long dashed double-short dashed line. Further, while not illustrated in the figures, an ignition device for combusting the fuel gas not used in power generation is provided in the module 1.

The power generating unit illustrated in FIG. 1 includes a heat exchanger 6 that subjects exhaust gas (exhaust heat) to heat exchange to decrease the temperature of the exhaust gas, the exhaust gas being generated through the power generation in the fuel cells that constitute the cell stack 2. In the present embodiment, while described in detail later, the heat exchanger 6 functions as a heating unit, and therefore the heating unit is described as the heat exchanger 6 in the following descriptions. The power generating unit illustrated in FIG. 1 includes further a condensed water treatment device 7 for turning condensed water obtained by the condensation of moisture contained in the exhaust gas into pure water, and a water tank 8 for storing the water (pure water) treated by the condensed water treatment device 7. The water tank 8 and the heat exchanger 6 are connected through a condensed water supply pipe 9. Further, depending on the quality of the condensed water generated by heat exchange in the heat exchanger 6, the condensed water treatment device 7 may not be provided. Furthermore, when the condensed water treatment device 7 is capable of storing water, the water tank 8 may not be provided.

The water stored in the water tank 8 is supplied to the reformer 3 by a water pump 11 provided in a water supply pipe 10 that connects the water tank 8 and the reformer 3.

Furthermore, the power generating unit illustrated in FIG. 1 includes a supply power regulating unit (power conditioner) 12 that converts DC power generated in the module 1 into AC power and regulates the amount of converted electricity to be supplied to an external load, and a controller 13 that controls the operation of various devices. Each of these devices constituting the power generating unit is housed in an exterior casing, which forms a simple fuel cell device that can be easily installed.

The following describes a thermoacoustic cooler 14. The thermoacoustic cooler 14 includes a prime mover 15, a cooler 16, and a connecting pipe 17 that connects the prime mover 15 and the cooler 16. Note that the prime mover 15, the cooler 16, and the connecting pipe 17 are filled with a gas such as a helium gas. Further, heat accumulators 18, 19 are respectively disposed in the prime mover 15 and the cooler 16. One side of the heat accumulator 18 of the prime mover 15 serves as a high-temperature portion 22 (upper side in FIG. 1) while the other side serves as a low-temperature portion 20 (lower side in FIG. 1). Thermoacoustic energy (sound waves) is produced by the temperature gradient between the two.

In FIG. 1, although described later, the prime mover 15 is configured to allow the exhaust gas discharged from the module 1 to flow around the high-temperature portion 22 of the heat accumulator 18. While, on the other hand, nothing is provided around the low-temperature portion 20 in FIG. 1, in order to produce thermoacoustic energy more efficiently, the prime mover 15 may be configured to allow a low-temperature refrigerant (such as tap water) to flow around the low-temperature portion 20. The high-temperature portion 22, the low-temperature portion 20, and the heat accumulator 18 form a thermoacoustic energy producing unit. This thermoacoustic energy producing unit is indicated by the dashed line in FIG. 1.

The thermoacoustic energy produced in the thermoacoustic energy producing unit resonates upon flowing through the prime mover 15 and the connecting pipe 17, and is transmitted to the cooler 16. In the cooler 16, the thermoacoustic energy is converted into thermal energy. Then, a fluid is made to flow to a high-temperature portion 23 (upper side in FIG. 1) on one side of the heat accumulator 19. This causes an endothermic reaction to occur in a low-temperature portion 21 (lower side in FIG. 1) on the other side of the heat accumulator 19, and decreases the temperature. As a result, a cooling function is imparted to the cooler 16. That is, the heat accumulator 19, the high-temperature portion 23, and the low-temperature portion 21 form a cooling unit. This cooling unit is indicated by the dashed line in FIG. 1.

Note that, in the cooling unit, the high-temperature portion 23 only needs to be higher in temperature than the low-temperature portion 21, and not high in temperature in the general sense. Specifically, decreasing the temperature of the high-temperature portion 23 decreases the temperature of the low-temperature portion 21 even further, thereby imparting a cooling function as well as a refrigerating function to the cooling unit. In other words, the cooling unit has the function as a refrigerating unit. Thus, while in FIG. 1 a second piping 24 described later is provided so that a second fluid that flows through this second piping 24 flows around the low-temperature portion 21 and then flows around the high-temperature portion 23, the second piping 24 need not necessarily be provided around the high-temperature portion 23.

Further, an exhaust gas switching unit 25 is provided for allowing the exhaust gas discharged from the module 1 to flow into at least one of the heat exchanger 6 and the thermoacoustic cooler 14. The provision of the exhaust gas switching unit 25 makes it possible to allow the exhaust gas to suitably flow into the heat exchanger 6 or the thermoacoustic cooler 14 as needed, and thus provide a heating effect and a cooling effect.

Thus, during hot periods such as summer, it is possible to make the exhaust gas discharged from the module 1 flow into the thermoacoustic cooler 14, and then utilize the second fluid cooled by the cooling unit 21 to provide a cooling function. Further, during cold periods such as winter, it is possible to make the exhaust gas discharged from the module 1 flow into the heat exchanger 6, and then utilize the first fluid heated by the heat exchanger 6 to provide a heating function. This makes it possible to provide an efficient cooling and heating device.

Note that while FIGS. 1 and 2 illustrate a common house as an example of a cooling/heating target area, the target area is not limited thereto. The cooling/heating target area is not particularly limited as long as the area requires air conditioning, such as an architectural structure including a building, an aircraft, or a boat or ship.

Furthermore, FIGS. 1 and 2 illustrate an example in which circulation piping 26 is provided under the floor of this cooling/heating target area, and first piping 30 through which the first fluid flows, and the second piping 24 through which the second fluid flows are connected to this circulation piping 26. The first piping 30 is connected to the heat exchanger 6 and the second piping 24 is provided around the cooling unit. Note that one end of the first piping 30 and one end of the second piping 24 are connected to the circulation piping 26 via a first switching unit 27, and the other end of the first piping 30 and the other end of the second piping 24 are connected to the circulation piping 26 via a second switching unit 28. Thus, the controller 13 allows the first fluid or the second fluid to flow through the circulation piping 26 by controlling the first switching unit 27 and the second switching unit 28, making it possible to effectively function as a cooling and heating device.

However, because it is only necessary to provide a cooling and heating function in the cooling/heating target area, the first piping 30 and the second piping 24 may each have a circulation piping function as individual piping or, for example, may each be provided with an open end structure so that the first fluid that flows through the first piping 30 and the second fluid that flows through the second piping 24, or the air or the like heated and cooled by these fluids, are directly supplied to the cooling/heating target area. In this case, the circulation piping is not required. Incidentally, in this case, a blower is preferably attached to one end side of each piping to supply air to the first piping 30 and the second piping 24.

The following describes an operation method of the cooling and heating device illustrated in FIGS. 1 and 2. At startup of the fuel cell device, the controller 13 activates the raw fuel supplying means 4, the oxygen-containing gas supplying means 5, the water pump 11, and the ignition device. At this time, the temperature of the module 1 is low, and thus power is not generated in the fuel cells and a reformation reaction is not performed in the reformer 3. The fuel gas supplied by the raw fuel supplying means 4 that has not been used in power generation is combusted almost in its entirety, and the combustion heat increases the temperatures of the module 1 and the reformer 3. When the temperature of the reformer 3 reaches a temperature that allows steam reforming, the reformer 3 performs steam reforming and a fuel gas which is a hydrogen-containing gas required for power generation in the fuel cells is produced. Note that, once the reformer 3 reaches a temperature that allows steam reforming, the controller 13 may also perform control so as to activate the water pump 11. When the fuel cells reach a temperature that allows power generation to start, the fuel cells start generating power using the fuel gas produced in the reformer 3 and the oxygen-containing gas supplied by the oxygen-containing gas supplying means 5. The electricity generated in the cell stack 2 is converted to AC in the supply power regulating unit 12 and then supplied to an external load.

Note that, after power generation has started in the fuel cells, the controller 13 controls the operation of the raw fuel supplying means 4, the oxygen-containing gas supplying means 5, the water pump 11, and the like on the basis of a fuel utilization rate (Uf), an air utilization rate (Ua), and a steam to carbon (S/C) ratio set in advance in order to efficiently operate the fuel cell device. The S/C is a molar ratio of the water and the carbon in the fuel under the steam reforming performed by the reformer 3. The fuel utilization rate is a value obtained by dividing the amount of fuel gas used in power generation by the amount of fuel gas (raw fuel) supplied by the raw fuel supplying means 4, and the air utilization rate is a value obtained by dividing the amount of air used in power generation by the amount of air supplied by the oxygen-containing gas supplying means 5.

The exhaust gas produced in association with the operation of the cell stack 2 is made to flow into at least one of the heat exchanger 6 and the thermoacoustic cooler 14 by the exhaust gas switching unit 25. Whether the exhaust gas is made to flow into the heat exchanger 6 or the thermoacoustic cooler 14 can be set by the user or automatically switched.

For example, a cooling and heating switch is provided in the cooling/heating target area (the switch including shutdown as well) and, when the user switches the switch to utilize cooling or when cooling is automatically run when a predetermined condition is satisfied, the controller 13 controls the exhaust gas switching unit 25 so that at least a portion (preferably all) of the exhaust gas discharged from the module 1 flows into the thermoacoustic cooler 14. The exhaust gas that has flowed toward the thermoacoustic cooler 14 flows through the high-temperature portion 22 that constitutes the thermoacoustic energy producing unit in the prime mover 15 of the thermoacoustic cooler 14. Specifically, piping (a flow path) through which the exhaust gas discharged from the module 1 flows is provided so as to surround the one side (high-temperature portion 22) of the piping having the heat accumulator 18 disposed therein. With such a configuration, the exhaust gas flows through the high-temperature portion 22 of the thermoacoustic energy producing unit. Similarly, in the following descriptions, each piping is disposed so as to surround the piping of the thermoacoustic cooler 14, and configured so that each fluid flows through each area of the thermoacoustic cooler 14.

As a result, a temperature gradient is produced between the one side and the other side of the heat accumulator 18, making it possible to generate thermoacoustic energy. Note that the low-temperature portion 20 as the thermoacoustic energy producing unit can produce thermoacoustic energy more efficiently when the difference in temperature between the low-temperature portion 20 and the high-temperature portion 22 increases, and therefore tap water having a room temperature or the like may be supplied to the low-temperature portion 20, for example.

In this case, the controller 13 controls the first switching unit 27 and the second switching unit 28 so that the second fluid (water, air, or the like) that flows through the second piping 24 flows through the circulation piping 26. That is, the second fluid that flows through the second piping 24 is cooled while flowing through the low-temperature portion 21 of the cooling unit 20, and the cooled second fluid flows through the circulation piping 26 via the high-temperature portion 23 of the cooling unit 20, thereby cooling the cooling/heating target area and providing a cooling function. Note that the second piping 24 is configured to allow the second fluid that has flowed through the low-temperature portion 21 of the cooling unit to flow through the high-temperature portion 23, making it possible to further enhance the cooling function of the cooling unit. Further, the amount (flow rate) of the second fluid that flows through the second piping 24 and the circulation piping 26 can be regulated as appropriate by controlling a pump 31 provided between the first switching unit 27 and the second switching unit 28.

Further, FIGS. 1 and 2 illustrate an example in which a temperature sensor 29 is provided in the cooling/heating target area. For example, the controller 13 may perform control so that the first switching unit 27 and the second switching unit 28 are automatically switched to allow the second fluid to flow through the circulation piping 26, when the temperature sensor 29 satisfies a suitably set first condition (a temperature of at least 25° C. continuing for at least one hour, for example). Note that while FIGS. 1 and 2 illustrate an example in which the temperature sensor 29 is provided in the cooling/heating target area, the location in which the temperature sensor 29 is provided is not limited thereto, and the temperature sensor 29 may be disposed outside the cooling/heating target area to measure the temperature of an outside air.

On the other hand, when the user changes the switch to utilize heating or when heating is automatically run when a predetermined condition is satisfied, the controller 13 controls the exhaust gas switching unit 25 so that at least a portion (preferably all) of the exhaust gas discharged from the module 1 flows into the heat exchanger 6 serving as the heating unit. The exhaust gas that has flowed toward the heat exchanger 6 exchange heat with the first fluid (water, air, or the like) that flows through the first piping 30 connected to the heat exchanger 6, heating the first fluid.

Then, the controller 13 controls the first switching unit 27 and the second switching unit 28 so that the first fluid that flows through the first piping 30 flows through the circulation piping 26. That is, the first fluid that flows through the first piping 30 is heated while flowing through the heat exchanger 6, and the heated first fluid flows through the circulation piping 26, thereby heating the cooling/heating target area and providing a heating function. Further, the amount (flow rate) of the first fluid that flows through the first piping 30 and the circulation piping 26 can be suitably regulated by controlling the pump 31 provided between the first switching unit 27 and the second switching unit 28.

Incidentally, to automatically start the heating function on the basis of the temperature sensor 29 provided in the cooling/heating target area, the controller 13 may perform control so that the first switching unit 27 and the second switching unit 28 are automatically switched to allow the first fluid to flow through the circulation piping 26, when the temperature sensor 29 satisfies a suitably set second condition (a temperature of at least 10° C. continuing for at least one hour, for example).

The adoption of such an operation method as described above results in the development of a novel application that combines the fuel cell device and the thermoacoustic cooler 14, making it possible to achieve an efficient cooling and heating device.

Note that, for example, when the user turns off the cooling and heating switch, or when the temperature measured by the temperature sensor does not satisfy the first and second condition (a temperature of at least 10° C. and less than 25° C. continuing for at least one hour, for example), the controller 13 may control the exhaust gas switching unit 25 so that the exhaust gas flow as is into the thermoacoustic cooler 14 in order to discharge the exhaust gas outside. In this case, the controller 13 preferably stops the pump 31 as well. Note that the first condition and the second condition may be set as appropriate.

On the other hand, when water for steam reforming in the reformer 3 is to be produced using the heat exchanger 6, the controller 13 can also control the operation of the exhaust gas switching unit 25 and the pump 31 so that condensed water is obtained in amounts as necessary. However, the operation of the pump 31 is preferably suitably controlled so that a large amount of first fluid does not flow through the circulation piping 26.

Incidentally, in the cooling and heating device illustrated in FIGS. 1 and 2, solid oxide fuel cells (cell stack 2) are used as the fuel cells, and thus the heat of the exhaust gas discharged from the module 1 becomes extremely high in temperature. Using such exhaust gas makes it possible to efficiently produce the first fluid heated by the heat exchanger 6 and the second fluid cooled by the thermoacoustic cooler 14.

Next, the fuel cell device of the present embodiment will be described.

FIG. 3 is an exterior perspective view of an example of a module in a fuel cell device constituting the cooling and heating device of the present embodiment, and FIG. 4 is a cross-sectional view of FIG. 3.

The module 1 illustrated in FIG. 3 includes two cell stacks 2 and a cell stack device 40 housed in a housing 34. In each of the cell stacks 2, cylinder-shaped fuel cells 32 are arranged uprightly in a row, each including a fuel gas flow path (not illustrated) through which a fuel gas flows; the fuel cells 32 adjacent to each other are electrically connected in series via a current collection member (not illustrated in FIG. 3); and a lower end of each of the fuel cells 32 is fixed to a manifold 33 by an insulative bonding material (not illustrated) such as a glass sealing material. In the cell stack device 40, the reformers 3 for producing a fuel gas to be supplied to the fuel cells 32 are disposed above each of the cell stacks 2. At both end portions of each of the cell stacks 2, there is disposed an electrically conductive member that includes an electricity drawing unit for collecting electricity generated by the power generation in the cell stack 2 (the fuel cells 32) and drawing the electricity to the outside (not illustrated). The cell stack device 40 is thus configured with each of the members described above. Note that FIG. 3 illustrates an example in which the cell stack device 40 includes two cell stacks 2. However, the number of cell stacks may be changed as appropriate; for example, the cell stack device 40 may include only one cell stack 2.

Further, the examples of the fuel cells 32 illustrated in FIG. 3 are hollow flat plate-shaped fuel cells that each include a fuel gas path that allows fuel gas to flow through the fuel cells in the lengthwise direction thereof. The fuel cells 32 are solid oxide fuel cells that each include a fuel electrode layer, a solid electrolyte layer, and an oxygen electrode layer stacked in that order on a surface of a support body that includes the fuel gas path. Note that oxygen-containing gas flows between the fuel cells 32.

Further, in the fuel cell device of the present embodiment, the fuel cells 32 may be solid oxide fuel cells, and flat plate shaped or cylindrical shaped, for example. In addition, the shape of the housing 34 may also be changed as appropriate.

Moreover, the reformer 3 illustrated in FIG. 3 reforms a raw fuel such as natural gas or kerosene supplied via a raw fuel supply pipe 39 to produce a fuel gas. It is preferable that the reformer 3 be capable of performing steam reforming which has an efficient reforming reaction. The reformer 3 includes a vaporizing unit 36 that vaporizes water and a reforming unit 37 that has a reforming catalyst (not illustrated) for reforming the raw fuel into fuel gas disposed therein. Then, the fuel gas produced in the reformer 3 is supplied to the manifold 33 via a fuel gas leading-out pipe 38. The fuel gas is then supplied via the manifold 33 to the fuel gas paths formed inside the fuel cells 32.

Moreover, FIG. 3 illustrates the cell stack device 40 housed in the housing 34, with the cell stack device 40 removed rearward and a portion of the housing 34 (front and back surfaces) removed. Here, in the module 1 illustrated in FIG. 3, the cell stack device 40 can be slid and housed in the housing 34.

Note that an oxygen-containing gas leading-in member 35 is disposed in the interior of the housing 34, between the cell stacks 2 arranged side by side on the manifold 33, so that the oxygen-containing gas flows along the sides of the fuel cells 32, from a lower end portion toward an upper end portion.

As illustrated in FIG. 4, the housing 34 of the module 1 has a two-layer structure that includes an inner wall 41 and an outer wall 42. The outer wall 42 forms the outer frame of the housing 34, and the inner wall 41 forms a power generation chamber 43 that houses the cell stack device 40. Furthermore, in the housing 34, the space between the inner wall 41 and the outer wall 42 forms an oxygen-containing gas flow path 44 through which oxygen-containing gas flows toward the fuel cells 32.

Here, the oxygen-containing gas leading-in member 35 is inserted from an upper portion of the housing 34, passing through the inner wall 41, and fixed. The oxygen-containing gas leading-in member 35 includes, on an upper side, an oxygen-containing gas inflow opening (not illustrated) through which the oxygen-containing gas flows, and flanges 45; and, on a lower side, an oxygen-containing gas outflow opening 46 through which the oxygen-containing gas flows toward a lower end portion of each of the fuel cells 32. Moreover, a thermal insulating member 47 is arranged between each flange 45 and the inner wall 41.

Note that while the oxygen-containing gas leading-in member 35 is disposed so as to be positioned between the two cell stacks 2 arranged side by side in the interior of the housing 34 in the FIG. 4, the number of the cell stacks 2 may be changed as appropriate. For example, when the housing 34 houses only one cell stack 2, two oxygen-containing gas leading-in members 35 may be provided and disposed so as to sandwich the cell stack 2 from both side surface sides.

Moreover, the thermal insulating members 47 may also be formed inside the power generation chamber 43 as appropriate in order to maintain a high temperature inside the module 1, which prevents a decrease in the temperature of the fuel cells 32 (cell stacks 2) and a decrease in power output that result from excessive radiation of heat from the inside of the module 1.

It is preferable that the insulating members 47 be arranged in the vicinity of the cell stacks 2. It is particularly preferable that the insulating members 47 be arranged on the side surfaces of the cell stacks 2 extending in the direction in which the fuel cells 32 are arranged and that the insulating members 47 have a width greater than or equal to the width of the side surfaces of the cell stacks 2 in the direction in which the fuel cells 32 are arranged. It is preferable that the thermal insulating members 47 be arranged on both side surface sides of the cell stacks 2. This makes it possible to effectively inhibit temperature decreases in the cell stacks 2. Furthermore, this makes it possible to inhibit oxygen-containing gas led in by the oxygen-containing gas leading-in member 35 from being discharged from the side surface sides of the cell stacks 2, thereby making it possible to promote the flow of oxygen-containing gas between the fuel cells 32 of the cell stacks 2. Note that openings 48 are formed in the thermal insulating members 47 arranged on both side surface sides of the cell stacks 2 in order to regulate the flow of oxygen-containing gas to the fuel cells 32 and to decrease the differences in temperature in the lengthwise direction in which the fuel stacks 2 extend as well as in the direction in which the fuel cells 32 are stacked.

Moreover, on the inner sides of the inner walls 41 extending in the direction in which the fuel cells 32 are arranged, exhaust gas inner walls 49 are formed. The space between the inner walls 41 and the exhaust gas inner walls 49 forms exhaust gas flow paths 50 that allow the exhaust gas inside the power generation chamber 43 to flow from top to bottom. Furthermore, the exhaust gas flow paths 50 are communicated to an exhaust hole 51 formed at the bottom of the housing 34. Further, the thermal insulating members 47 are provided on the cell stack 2 side of the exhaust gas inner walls 49 as well.

Accordingly, exhaust gases produced when the module 1 operates (during a startup process, power generation, or a shutdown process) flow through the exhaust gas discharge paths 50 and then are discharged through the exhaust hole 51. Note that the exhaust hole 51 may be formed by cutting out a portion of the bottom of the housing 34 or by using a pipe-shaped member.

Note that, inside the oxygen-containing gas leading-in member 35, a thermocouple 52 for measuring the temperature near the cell stacks 2 is formed such that a temperature sensing portion 53 of the thermocouple 52 is positioned at the center of the fuel cells 32 in the lengthwise direction and at the center in the direction in which the fuel cells 32 are arranged.

Further, in the module 1 configured as described above, at least a portion of the fuel gas and the oxygen-containing gas discharged from the fuel gas flow paths of the fuel cells 32 and not used in power generation is combusted between an upper end portion side of the fuel cells 32 and the reformers 3, making it possible to increase and maintain the temperature of the fuel cells 32. In addition, this makes it possible to heat the reformers 3 disposed above each of the fuel cells 32 (cell stacks 2), and efficiently perform a reformation reaction in the reformers 3. Furthermore, during normal power generation, the module 1 has a temperature of 500 to 800° C. due to the abovementioned combustion process and the generation of power in the fuel cells 32. Therefore, the exhaust gas discharged from the module 1 also become extremely high in temperature.

Figure 5:
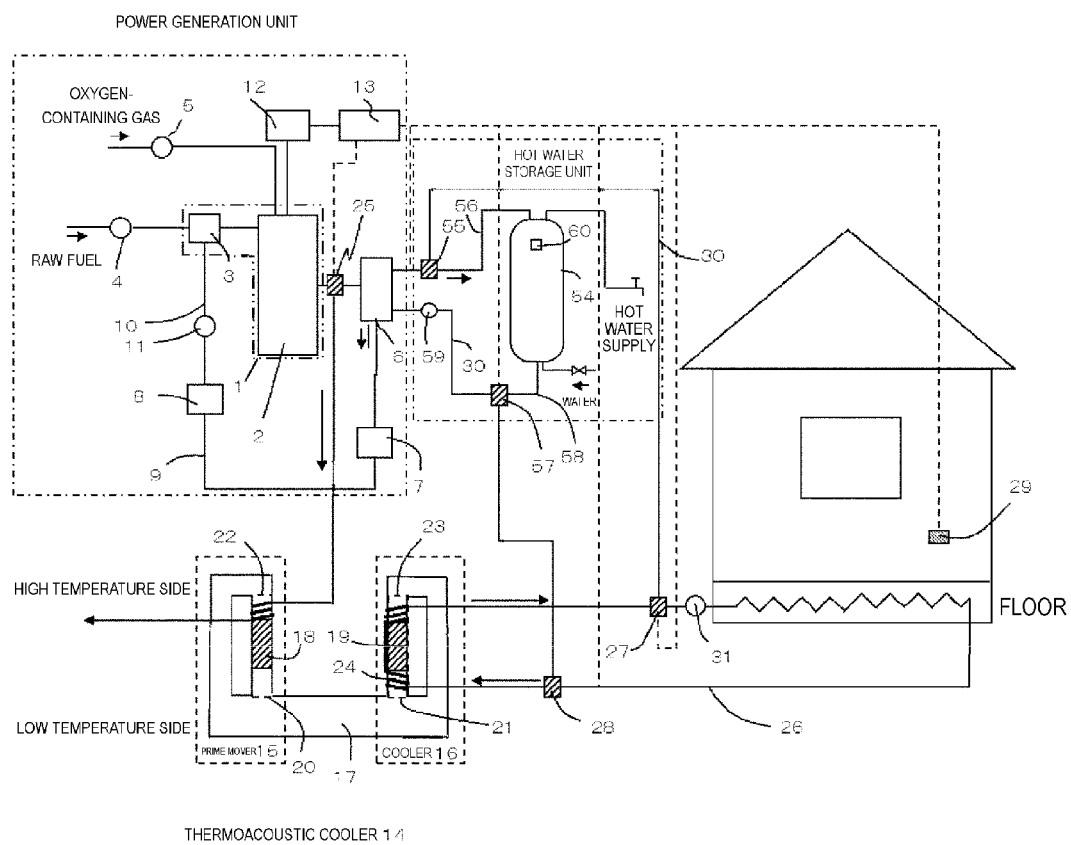
FIG. 5 is a configuration diagram illustrating yet another example of the configuration of the cooling and heating device of the present embodiment.
Figure 6:
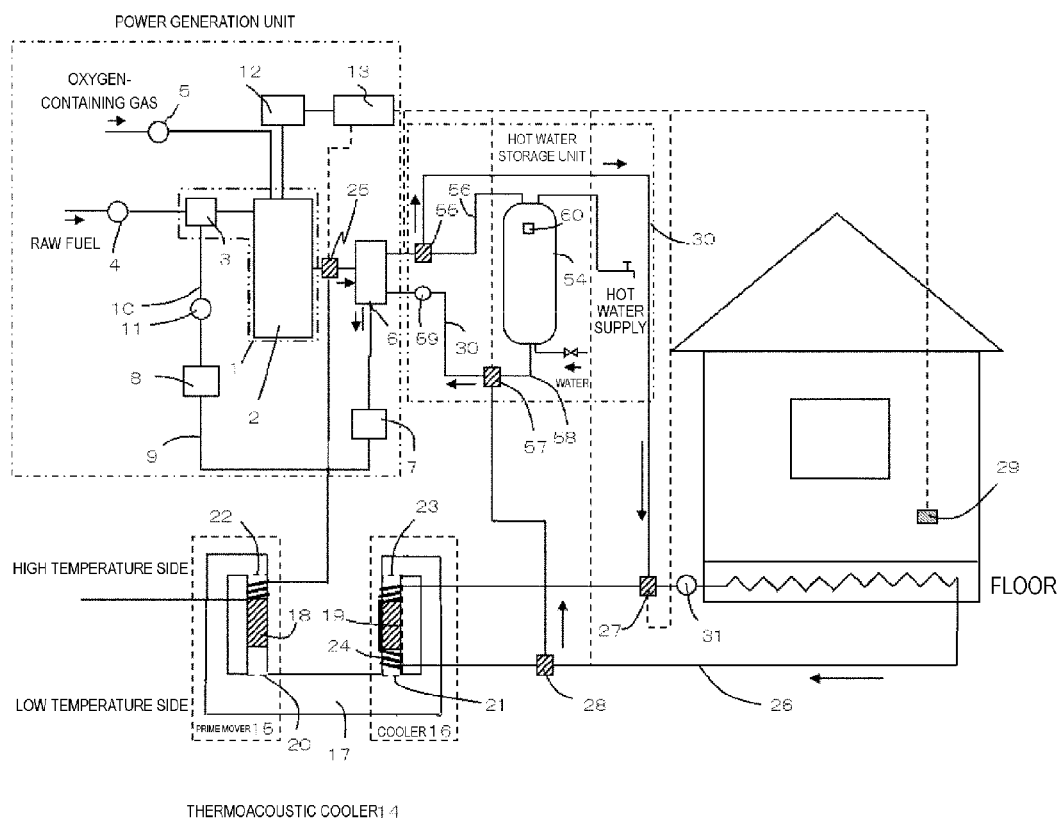
FIG. 6 is a configuration diagram illustrating yet another example of the configuration of the cooling and heating device of the present embodiment.

FIGS. 5 and 6 are configuration diagrams illustrating yet other examples of the configuration of the cooling and heating device of the present embodiment. FIG. 5 illustrates the cooling function, FIG. 6 illustrates the heating function, and the configuration of each device is the same. Thus, in the following descriptions of the configurations, FIG. 5 will be mainly used for explanation.

The cooling and heating devices illustrated in FIGS. 5 and 6, compared to the cooling and heating devices illustrated in FIGS. 1 and 2, differ in that each use water as the first fluid, and include a hot water storage unit including a hot water storage tank 54 for storing hot water heated and produced by the heat exchanger 6.

In the cooling and heating devices illustrated in FIG. 1 and FIG. 2, there is still room for improving the effective utilization of the heat of the exhaust gas discharged from the module 1, particularly when the cooling and heating switch has been turned off by user settings or automatic operation, and when the cooling and heating functions are in excess.

Here, in each of the cooling and heating devices illustrated in FIGS. 5 and 6, the hot water storage unit is provided, allowing hot water to be produced using the heat of the exhaust gas discharged from the module 1 and not used in cooling and heating. This hot water is thus provided as a hot water supply, making it possible to achieve a cooling and heating device having increased overall efficiency.

Here, the storage tank 54 includes water inflow piping 56 having one end connected to the first piping 30 via a third switching unit 55 and the other end connected to the hot water storage tank 54, and water outflow piping 58 having one end connected to the storage tank 54 and the other end connected to the first piping 30 via a fourth switching unit 57. Note that a pump 59 is provided between the heat exchanger 6 and the fourth switching unit in the first piping 30, and the hot water storage tank 54 includes a stored water volume sensor and a stored water temperature sensor for measuring the temperature and volume of the hot water stored in the hot water storage tank 54. These sensors are collectively referred to as hot water storage tank sensor 60 in the descriptions below.

For example, the following control is preferably performed to further improve overall efficiency in cases such as when the first fluid is not flowing through the circulation piping 26, when the operation of the pump 31 satisfies a predetermined condition (operation shutdown continuing for at least one hour, for example) to activate the pump 31 so that the temperature measured by the temperature sensor 29 provided in the cooling/heating target area reaches a predetermined temperature range (a temperature of at least 10° C. and less than 25° C., for example), and when the temperature and the volume of the hot water measured by the hot water storage tank sensor 60 are less than or equal to predetermined ranges.

For example, the following describes the control performed on the basis of the temperature and the volume of the hot water measured by the hot water storage tank sensor 60. First, the controller 13 determines if the temperature and volume of the hot water in the hot water storage tank transmitted by the hot water storage tank sensor 60 are within the predetermined ranges. When the temperature and volume are within the predetermined ranges, the controller 13 continues the control performed up to that time.

When the temperature and volume are outside the predetermined ranges, the controller 13 controls the exhaust gas switching unit 25 so that at least a portion of the exhaust gas discharged from the module 1 flows into the heat exchanger 6. Then, the controller 13 controls the third switching unit 55 so that at least a portion of the hot water produced by the heat exchanger 6 flows to the water inflow piping 56, and controls the fourth switching unit 57 so that the water in the hot water storage tank 54 flows into the heat exchanger 6 via the water outflow piping 58.

Note that, when the control performed before this control requires the heating function, the controller 13 may control the third switching unit 55 and the fourth switching unit 57 so that a portion of the water that flows through the first piping 30 flows through the water inflow piping 56 and the water outflow piping 58. On the other hand, when the control performed before this control requires the cooling function, the controller 13 may control the third switching unit 55 and the fourth switching unit 57 so that all of the water flows through the water inflow piping 56 and the water outflow piping 58. The controller 13, in addition to this control, controls the exhaust gas switching unit 25 so that all or a portion of the exhaust gas discharged from the module 1 flow into the heat exchanger 6.

Specifically, when the temperature and the volume of the hot water in the hot water storage tank transmitted by the hot water storage tank sensor 60 are outside the predetermined ranges, and the temperature of outside air or the temperature of the cooling/heating target area satisfies the first condition (a temperature of at least 25° C. continuously for at least one hour, for example), the controller 13 may control the exhaust gas switching unit 25 so that the exhaust gas discharged from the module 1 is supplied into both the heat exchanger 6 and the thermoacoustic cooler 14. Further, when the temperature of outside air or the temperature of the cooling/heating target area satisfies the second condition (a temperature of less than 10° C. continuously for at least one hour, for example), the controller 13 may control the exhaust gas switching unit 25 so that the exhaust gas discharged from the module 1 is supplied only to the heat exchanger 6.

With such a configuration, the cooling and heating device further includes a hot water supply function in addition to the cooling and heating function, making it possible to achieve a cooling and heating device having increased overall efficiency.

Note that, in the above, when the first fluid is not flowing through the circulation piping 26, and when the operation of the pump 31 satisfies a predetermined condition (operation shutdown continuing for at least one hour, for example) to activate the pump 31 so that the temperature measured by the temperature sensor 29 provided in the cooling/heating target area reaches a predetermined temperature range (a temperature of at least 10° C. and less than 25° C., for example) as well, the controller 13 performs control similar to that described above, making it possible to achieve a cooling and heating device control having increased overall efficiency.

The present invention has been described in detail above. However, the present invention is not limited to the embodiments described above, and various modifications or improvements can be made without departing from the spirit of the present invention.

For example, while the aforementioned hybrid system has been described using a fuel cell device that includes solid oxide fuel cells as an example of the fuel cell device, the fuel cell device may be a solid high polymer fuel cell device, for example. When a solid high polymer fuel cell device is used, the heat produced in the reformation reaction, for example, may be effectively utilized, and the configuration may be changed as appropriate.

REFERENCE SIGNS LIST

1 Fuel cell module
6 Heat exchanger
14 Thermoacoustic cooler
24 Second piping
25 Exhaust gas switching unit
26 Circulation piping
27 First switching unit
28 Second switching unit
29 Temperature sensor
30 First piping
54 Hot water storage tank
55 Third switching unit
56 Water inflow piping
57 Fourth switching unit
58 Water outflow piping
60 Hot water storage tank sensor

The invention claimed is:

1. A cooling and heating device comprising:
a fuel cell device comprising a fuel cell;
a heating unit configured to utilize heat of an exhaust gas discharged from the fuel cell;
a thermoacoustic cooler comprising a cooling unit which is configured to perform a cooling function with use of the heat of the exhaust gas discharged from the fuel cell; and
an exhaust gas switching unit that allows the exhaust gas discharged to flow from the fuel cell to at least one of the thermoacoustic cooler and the heating unit.

2. The device according to claim 1,
wherein the heating unit comprises a heat exchanger that exchanges heat between the exhaust gas discharged from the fuel cell and a first fluid.

3. The device according to claim 2, further comprising:
a first piping connected to the heat exchanger, and configured to flow a first fluid; and
a second piping provided on a periphery of the cooling unit, and configured to flow a second fluid;
wherein the exhaust gas switching unit flows one of the first fluid and the second fluid to a cooling/heating target area.

4. The device according to claim 3, further comprising:
circulation piping provided in the cooling/heating target area,
wherein one end of the first piping and one end of the second piping are connected to the circulation piping via a first switching unit, and
an other end of the first piping and an other end of the second piping are connected to the circulation piping via a second switching unit.

5. The device according to claim 4, further comprising:
a controller that controls the first switching unit and the second switching unit,
wherein the controller controls the first switching unit and the second switching unit to allow one of the first fluid and the second fluid to flow through the circulation piping on the basis of a predetermined condition.

6. The device according to claim 5, further comprising:
a temperature sensor that measures one of a first temperature related to an outside air and a second temperature related to the cooling/heating target area, the predetermined condition includes a first condition related to a measurement of the first temperature or the second temperature, wherein the controller controls the first switching unit and the second switching unit to allow the second fluid to flow through the circulation piping when the measurement by the temperature sensor satisfies the first condition.

7. The device according to claim 5, further comprising:
a temperature sensor that measures one of a first temperature related to an outside air and a second temperature related to the cooling/heating target area,
the predetermined condition includes the second condition related to a measurement of the first temperature or the second temperature,
wherein the controller controls the first switching unit and the second switching unit to allow the first fluid to flow through the circulation piping when the measurement satisfies the second condition.

8. The device according to claim 6,
wherein the controller controls the exhaust gas switching unit to allow the exhaust gas discharged from the fuel cell to flow into the thermoacoustic cooler when the second fluid flows through the circulation piping.

9. The device according to claim 7,
wherein the controller controls the exhaust gas switching unit to allow the exhaust gas discharged from the fuel cell to flow into the heat exchanger when the first fluid flows through the circulation piping.

10. The device according to claim 3, further comprising:
a hot water storage tank;
a third switching unit and a forth switching unit, connected to the heat exchanger
a water inflow piping comprising one end connected to the first piping via the third switching unit, and an other end connected to the hot water storage tank; and
a water outflow piping comprising one end connected to the hot water storage tank and an other end connected to the first piping via the fourth switching unit.

11. The device according to claim 10,
wherein the hot water storage tank further comprises one of a stored water volume sensor and a stored water tank temperature sensor, and the controller controls the exhaust gas switching unit to allow the exhaust gas discharged from the fuel cell to flow into the heating unit or into the heating unit and the thermoacoustic cooler on the basis of a value measured by one of the stored water volume sensor and the stored water temperature sensor.

12. The device according to claim 11,
wherein the controller controls the third switching unit and the fourth switching unit on the basis of a value measured by one of the stored water volume sensor and the stored water temperature sensor.

13. The device according to claim 6, further comprising:
a hot water storage tank;
a water inflow piping comprising one end connected to the first piping via a third switching unit, and an other end connected to the hot water storage tank; and
a water outflow piping comprising one end connected to the hot water storage tank and an other end connected to the first piping via a fourth switching unit.

14. The device according to claim 7, further comprising:
a hot water storage tank;
a water inflow piping comprising one end connected to the first piping via a third switching unit, and an other end connected to the hot water storage tank; and
a water outflow piping comprising one end connected to the hot water storage tank and an other end connected to the first piping via a fourth switching unit.

15. The device according to claim 13,
wherein the controller controls the third switching unit and the fourth switching unit on the basis of a value measured by one of the stored water volume sensor and the stored water temperature sensor.

16. The device according to claim 14,
wherein the controller controls the third switching unit and the fourth switching unit on the basis of a value measured by one of the stored water volume sensor and the stored water temperature sensor.

* * * * *